Jan. 30, 1962   E. G. BIANCA   3,018,903
VEHICLE PARKING SYSTEM
Filed Jan. 6, 1959   7 Sheets-Sheet 1

INVENTOR.
Edoardo Giuseppe
Bianca
BY
Michael S. Striker
Attorney

Jan. 30, 1962   E. G. BIANCA   3,018,903
VEHICLE PARKING SYSTEM
Filed Jan. 6, 1959   7 Sheets-Sheet 3

Inventor:
Edoardo Giuseppe
          Bianca
by: Michael S. Striker
       Attorney Jan. 30, 1962 E. G. BIANCA 3,018,903
VEHICLE PARKING SYSTEM
Filed Jan. 6, 1959 7 Sheets-Sheet 4

Inventor:
Edoardo Giuseppe
Bianca
by Michael S. Striker
Attorney

Jan. 30, 1962    E. G. BIANCA    3,018,903
VEHICLE PARKING SYSTEM
Filed Jan. 6, 1959    7 Sheets-Sheet 5

Inventor:
Edoardo Giuseppe
Bianca
by: Michael S. Striker
Attorney

Jan. 30, 1962   E. G. BIANCA   3,018,903
VEHICLE PARKING SYSTEM
Filed Jan. 6, 1959   7 Sheets-Sheet 6

Fig. 16

Jan. 30, 1962  E. G. BIANCA  3,018,903
VEHICLE PARKING SYSTEM
Filed Jan. 6, 1959  7 Sheets-Sheet 7

Inventor:
Edoardo Giuseppe
Bianca
by
Michael S. Striker
Attorney

3,018,903
Patented Jan. 30, 1962

3,018,903
VEHICLE PARKING SYSTEM
Edoardo Giuseppe Bianca, Rosenweg 11, Zollikon, Zurich, Switzerland
Filed Jan. 6, 1959, Ser. No. 785,252
Claims priority, application Austria Jan. 8, 1958
9 Claims. (Cl. 214—16.1)

The subject of the invention is a vehicle parking system, including conveying apparatus with a conveyor cage which can travel vertically and horizontally between two portions of buildings consisting of chambers arranged side by side and one on top of another.

Amongst other purposes, such conveying arrangements are suitable for mechanical garages of medium height for moving the conveyor cage from the entrance position to one of the reception chambers which are arranged in rows one above another in about 8–12 stories.

For servicing the reception chambers of mechanical garages of the mentioned size there have already been proposed conveying arrangements which, for example, comprise a towerlike guide shaft which is suspended on a top carriage which is movable horizontally above the portions of the buildings, which guide shaft serves as a guide for the conveyor cage. In other known arrangements guide masts serve for guiding the cage, which guide masts are of framework and hang down on both sides of the cage from the top carriage. However, such arrangements are unduly heavy and require an extended shaft between the building portions. Constructions which set out to reduce the weight of the guide shafts or masts by means of light-weight construction have shown themselves to be unusable in consequence of their flexibility for high speeds of travel and with narrow tolerances. Omission of guide members, on at least one side of the cage in order to reduce the necessary length of the shaft between the building portions, cannot be permitted with the known arrangements because the guide members co-operated simultaneously with the catch members and must be arranged in a manner which excludes the creation of a tilting moment upon arresting of the cage falling in certain circumstances.

The purpose of the present invention is to obviate the above-mentioned disadvantages. For this purpose the arrangement according to the invention comprises a top carriage which can travel in the horizontal direction above the building portions with a single downwardly extending vertical guide mast which serves as a guide for a conveyor cabin suspended at the one side from the top carriage so that it can be raised and lowered, and of which mast the lower end is driven in synchronism with the top carriage.

In the accompanying drawings examples of embodiment of the subject of the invention are illustrated diagrammatically, and there are shown:

FIGURES 11, 12 are plan views

According to FIGURES 1 to 4 there are provided two buildings 1 and 1' with their fronts towards each other, between which buildings is a shaft 2. The buildings are provided with chambers 1'' open on the shaft side. On rails 3, 3' arranged above the top stories of the buildings 1 and 1' by means of wheels 4, 4' there runs a top carriage 5 which contains a haulage gear 6 consisting of a motor and transmission. This drives a cage 8 by means of a drive pulley 7, whereby a counter-weight 9 is moved. Thus the cage 8 and the drive pulley 7, as far as the vertical forces are concerned, are completely suspended on and secured to the top carriage 5. In order that upon a movement of the top carriage 5 on its rails 3, 3' the cage 8 retains its position relatively to the top carriage, that is it can neither tilt nor veer laterally and swing, the top end of a vertical guide mast 10 is attached to the top carriage 5 with the aid of a joint 11, whilst the bottom end of the same carries a guide roller 12 which is guided on a rail 13 arranged on the bottom of the shaft. During its vertical movement the cage 8 is guided along the guide mast 10 in the guides 14, 14'.

Figure 1:
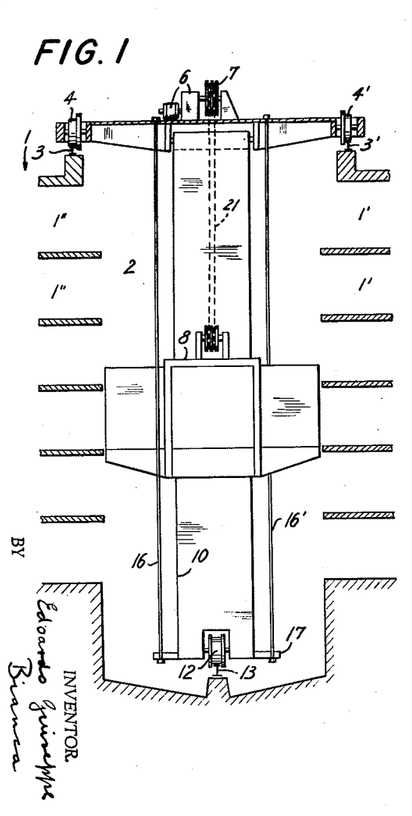
FIGURE 1 is an elevation of the conveying arrangement according to the invention partly in section and including a section of adjacent building portions.
Figure 2:
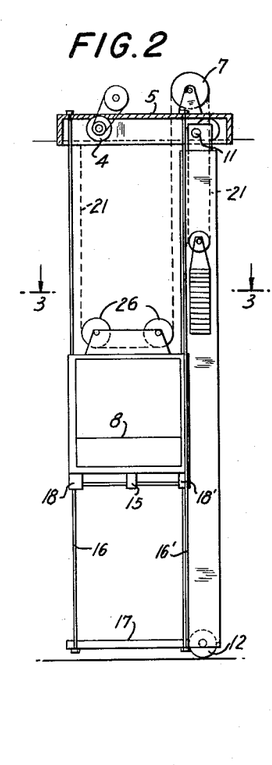
FIGURE 2 is the partly sectioned conveying arrangement seen from the side.

The cage 8 is fitted with a safety catch gear 15 with clamping members 18, 18', which catch gear comes into operation in case of rupture of the haulage rope and prevents the descent of the cage. This catch gear operates not in the usual manner upon the cage guides, but upon two tension members independent of the cage guides, preferably in the form of catch ropes 16, 16' which are suspended by their upper ends on the top carriage 5 and are maintained in tension by their lower ends attached to stretchers 17 secured to the mast 10. The catch ropes 16, 16' are arranged diagonally in relation to the cage so that the centre of gravity of the cage and its useful load is in the plane of the two catch ropes, preferably at an equal distance from each of the two catch ropes, so that upon arresting of the cage 8 both ropes 16, 16' are equally loaded and no tilting moment results.

For the horizontal movement the top carriage 5 comprises a driving motor 19, which drives an axle 20 of two support wheels of the top carriage 5. On a portion 21 of a support rope are suspended the cage 8 and the counter-weight 9.

Figure 3:
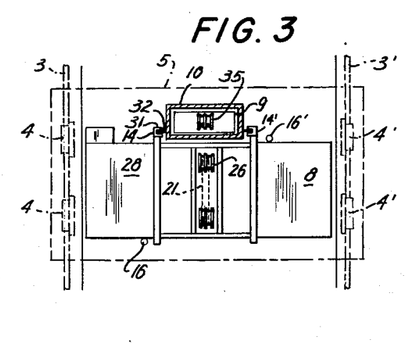
FIGURE 3 is a cross-sectional view taken on the line III—III of FIGURE 2.
Figure 4:
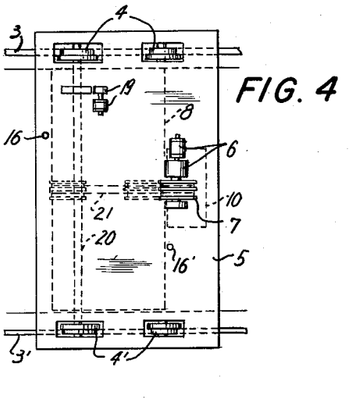
FIGURE 4 is a plan view of the conveying arrangement.

As best seen in FIG. 3, in the cage frame 25 are mounted two support pulleys 26 and circled by a portion of the support rope 21. On the bottom 28 of the cage 8 is arranged a guide member 29. Further, guide shoes 31 on guides 14, 14' co-operate with guide rails 32 which are arranged on the guide mast. The counter-weight 9 with the rope pulley 35 and guides 36, 36' of the counter-weight is inside the mast 10.

Figure 6:
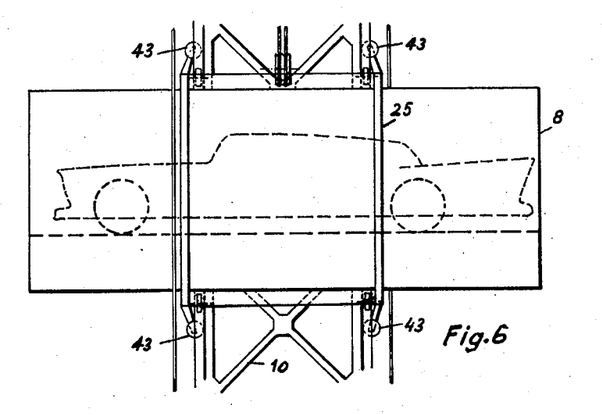
FIGURES 6, 7 and 8 are fragmentary views showing details of the embodiment of FIGS. 1–5, on a larger scale.
Figure 7:
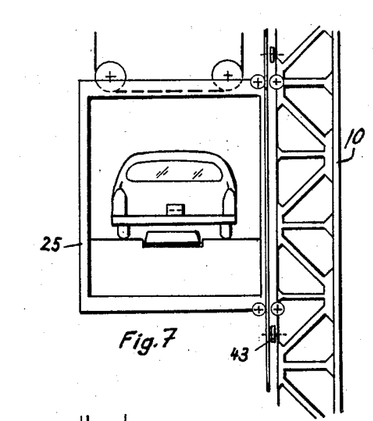
Figure 8:
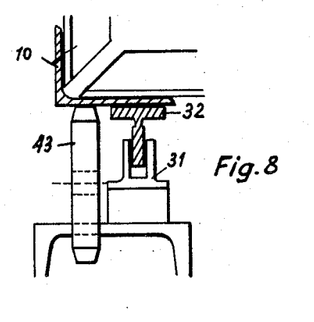

FIGURES 6, 7 and 8 illustrate details of the guiding of a cage 8 on a guide mast 10. The cage 8 comprises a cage frame 25 with guide shoes 42 which co-operate with guide rails 41 secured to the guide mast 40, whilst rollers 43 mounted on the cage frame 39 exert an additional stabilising of the guiding, which ensures a horizontal position of the longitudinal axis of the cage 39.

Figure 9:
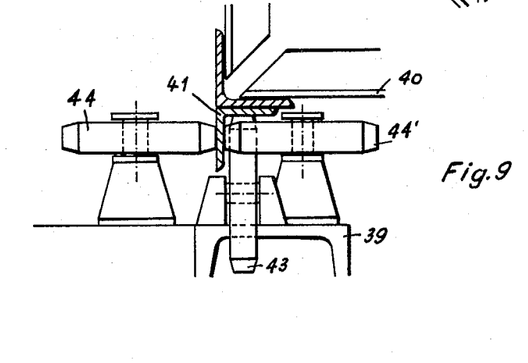
FIGURE 9 is a plan view of a modification of the cage guiding means.

FIGURE 9 shows an alternative guiding arrangement for a cage 39, effected only by rollers, the duties of the guide shoes 31 of the previous embodiment being taken over by the rollers 44, 44', which prevent any lateral tipping and deflection of the cage 39. Rollers 44, 44' are mounted on the cage frame and roll on guides 41 of mast 40. For stability about the horizontal longitudinal axis in this modification likewise rollers 43 are provided.

Figure 5:
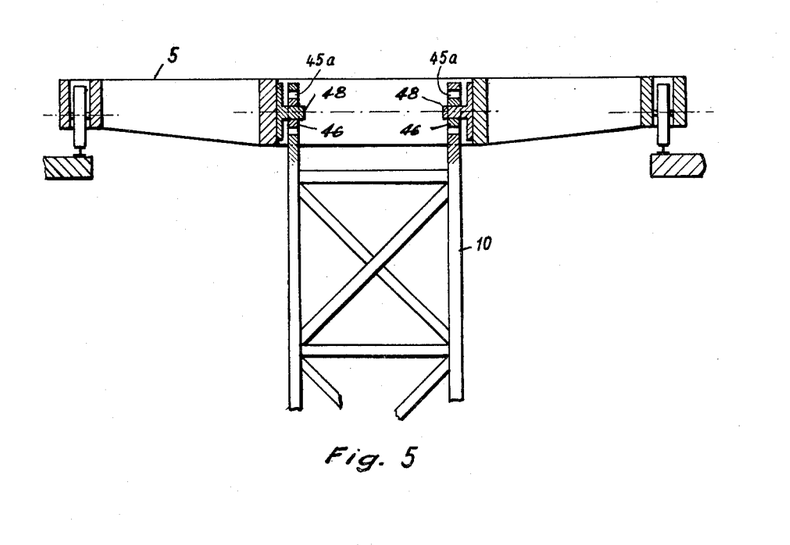
FIGURE 5 is a side elevation illustrating on an enlarged scale the preferred construction of the connection between the guide mast and the top carriage.
Figure 10:
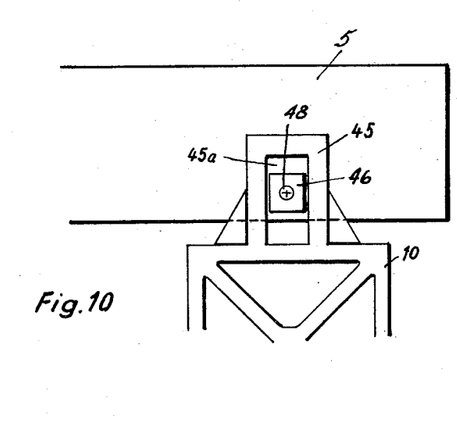
FIGURE 10 is a side view illustrating a detail of the construction of FIG. 5 on a larger scale.
Figure 16:
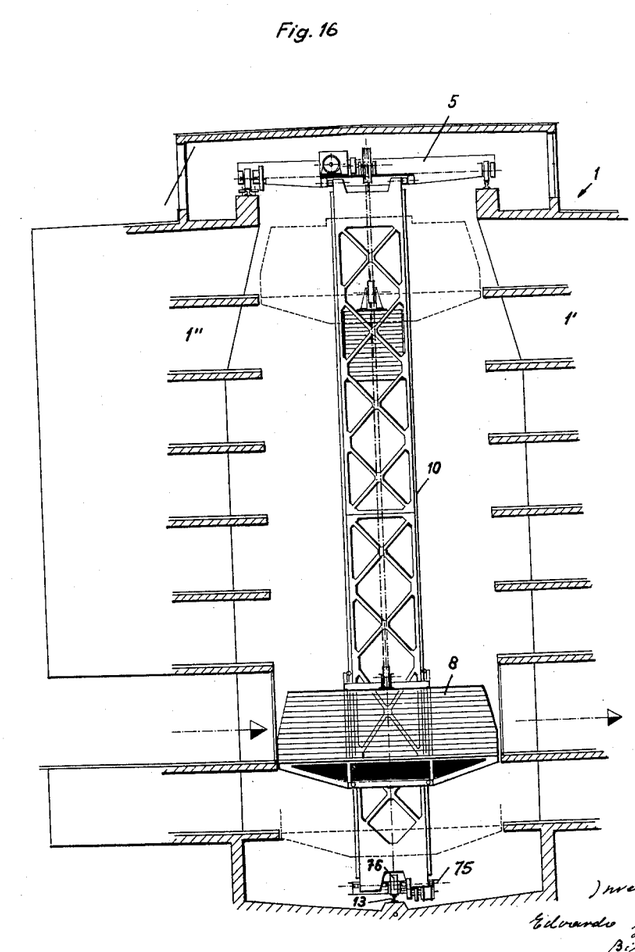
FIGURE 16 is an elevation, partly in section, arrangement according to FIGURE 1 provided with a drive for the lower mast portion.
Figure 17:
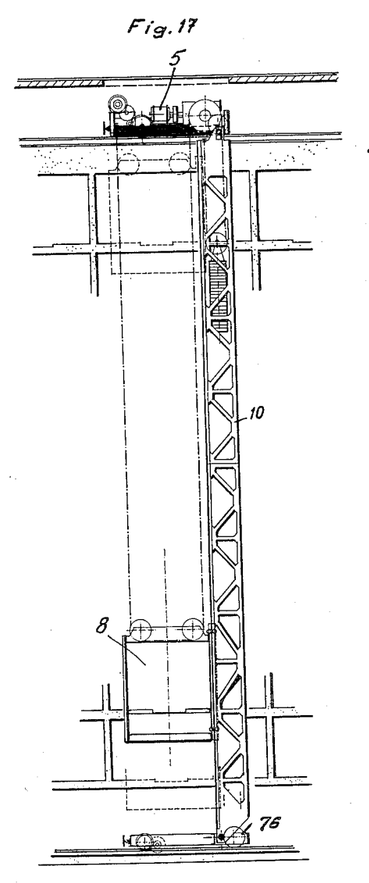
FIGURE 17 is a side view of the arrangement shown in FIG. 16.

FIGURE 5 and FIGURE 10 show the connection between mast 10 and top carriage 5. A pair of guide members 45 project upwardly from the top of mast 10, each member 45 having a slot 45a in which a slide block 46 is guided for vertical movement. Slide blocks 46 have bearing bores respectively receiving stud shafts 48 which are secured to top carriage 5. This connection allows a vertical movement of shaft 10 relative to carriage 5 so that the weight of mast 10 presses roller 12 onto rail 13 (see FIGS. 1 and 2) whereby the roller 12 can, if driven by motor means as shown in FIGS. 16 and 17, effect by friction on the rail 13 the horizontal movement of the lower end of the mast in synchronism with the movement of the top carriage 5. Since the sides of slots 45a are in sliding engagement with slide blocks 46, the top of the mast is connected to carriage 5 for horizontal movement, while a slight angular movement of the mast is made possible by shaft 48.

Figure 11:
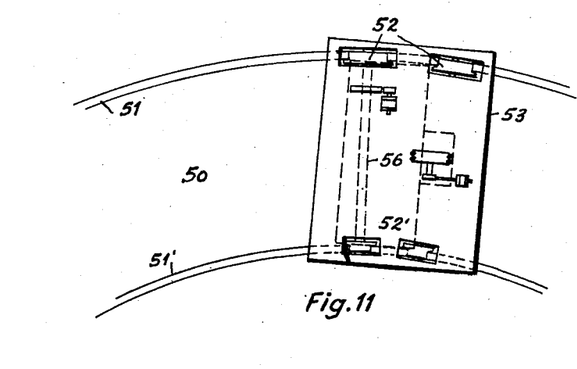
Figure 12:
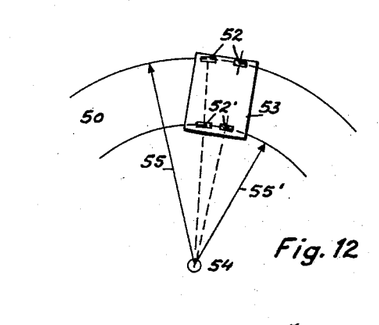
Figure 13:
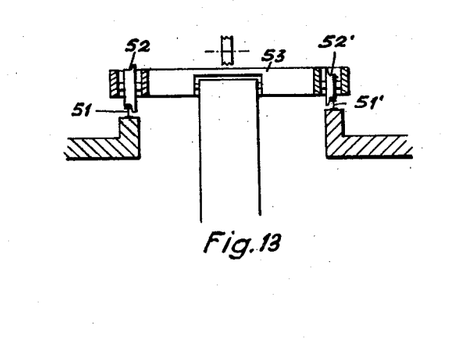
FIG. 13 is a fragmentary vertical section of an embodiment of the top carriage suitable for building portions extending in curves.

FIGURES 11, 12 and 13 illustrate the guiding of the top carriage for arcuate portions of buildings. At the sides of an arcuate shaft portion 50 are rails 51, 51' on which roll wheels 52, 52' the axles of which are arranged on a top carriage 53 convergently in such a way that their extensions intersect in the centre of curvature of the shaft 50. A wheel 52 is connected to a wheel 52' by a common driving axle and appropriately the diameters of the wheels 52 and 52' are proportioned similarly to the appertaining radii 55, 55' of the arcs of the corresponding rails 51, 51'.

This arrangement produces a precise and frictionless guiding. For simplicity it is convenient to place the rail 51' higher than the rail 51 by the difference in radius so that the axle 56 is horizontal.

Figure 14:
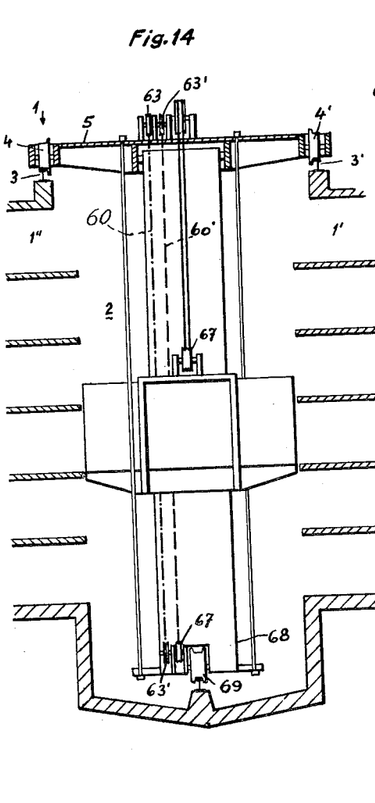
FIGURE 14 is a cross-section of a building assembly with a conveying arrangement provided with control means for the lower mast portion.
Figure 15:
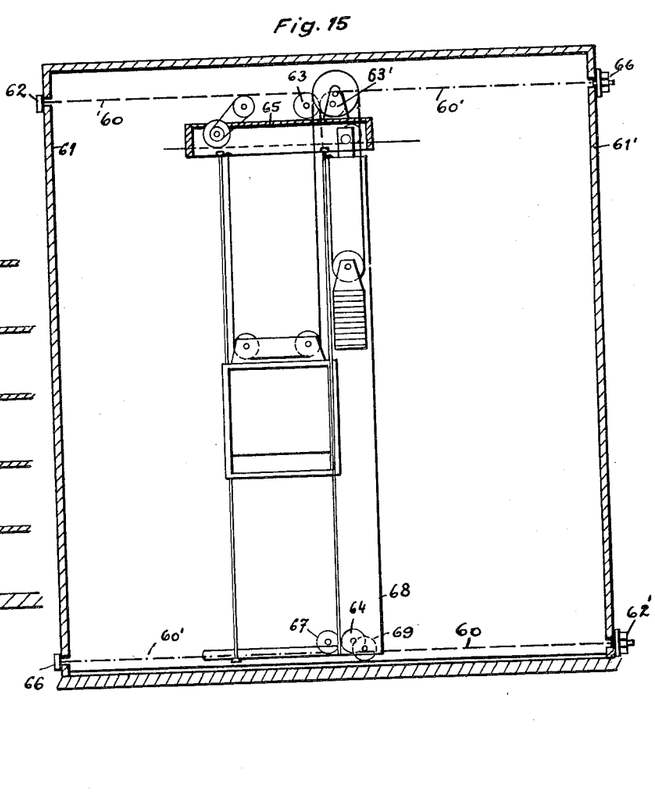
FIGURE 15 is the side elevation of the arrangement according to FIGURE 14.
Figure 15A:
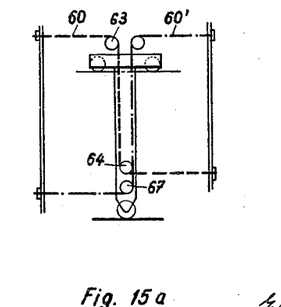
FIGURE 15a is a schematic side elevation illustrating the arrangement of tension ropes used in the arrangement of FIGURE 15.

FIGURES 14, 15 and 15a show an arrangement in which the guide rollers at the lower end 68 of the mast 10 of FIGS. 1–5 are not driven by independent motor means. For the synchronous movements of the two ends of the mast are employed the ropes 60 and 60', which are tensioned in the form of a letter Z from one end 61 to the other end 61' of the elevator shaft, the rope 60 being anchored at the point 62 of the shaft wall, over a roller 63 of the top carriage 65 vertically downwards and around the deflection roller 64 to an anchorage point 62' lying diagonally opposite the point 62. Likewise the rope 60' is guided from its anchorage point 66 on the lower shaft wall over a deflection roller 67 of the lower end of the mast and vertically upwards over a deflection roller 63' of the top carriage 65 to an anchorage point 66. In this manner the foot 68 of the mast upon horizontal movement of the top carriage 65 makes the same movement simultaneously.

FIGURES 16 and 17 show the building 1 which comprises two areas of chambers with chambers 1' and 1". On the top carriage 5 is suspended the cage 8 and the guide mast 10 is pivotally secured. The lower end of the guide mast 10 is guided and synchronously driven through a driving assembly 75 by means of the roller 76 engaging a rail.

Figure 18:
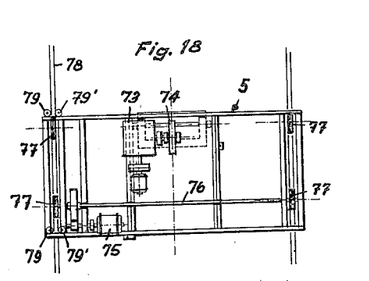
FIGURE 18 is a plan view showing details of the top carriage.

In FIGURE 18 the top carriage 5 is illustrated to a larger scale. For the haulage movement this top carriage comprises a drive pulley 74 driven by a haulage gear 73, and also a driving assembly 75 which is in operative connection with an axle 76 with two support wheels 77. For the straight guiding of the top carriage pairs 79, 79' of guide rollers co-operate with a rail 78. In this manner the parallel guiding gives rise to no direct friction.

Figure 19:
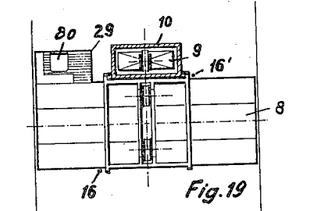
FIGURE 19 is a plan view showing details of the cage.

FIGURE 19 corresponds to FIG. 3 and shows the cage 8 with the guide member 80 located in part 29 of the cage 8. The counter-weight 9 travels in the interior of the guide mast 10. There are independent catch ropes 16 and 16'.

Figure 20:
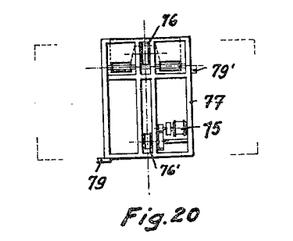
FIGURE 20 is a plan view showing a modified lower mast end portion.

In FIGURE 20 can be seen a frame 77 articulatedly secured at the foot of the guide mast 10, in which frame is arranged likewise articulatedly a drive assembly 75 for effecting movement. On the same frame 77 are also provided anchorage members 79, 79' for the lower ends of the catch ropes 16, 16'. One of the guide rollers 76, 76' of the mast is driven synchronously with the top carriage.

In the described moving arrangement the top carriage alone takes all the vertical forces (haulage forces and arresting forces), whilst the vertical guiding element is relieved of all vertical loads. This element serves solely and simply for vertical guiding and has to receive only the horizontal reaction and stabilising forces. The cage itself is totally suspended from the top carriage and is guided by two guide members of the mast lying on the same side of the cage.

The safety arresting gear operates upon catch anchorages or catch ropes which are completely independent of the guide mast. These are so arranged that the centre of gravity of the useful load of the cage is equidistant therefrom and in the plane defined thereby so that upon arresting no secondary tilting moments are produced. These tension members can be constructed of very small weight because they are subjected only to tension forces and thus in particular it is possible to use the conventional closed high tensile wire ropes of ropeways and suspension systems.

What I claim is:

1. An elevator system for a building having a plurality of floors with compartments arranged laterally of an elevator shaft, comprising, in combination, a top carriage adapted to be supported on the building for horizontal movement above the elevator shaft; an elevator cage suspended from said top carriage movable in vertical direction relative to said top carriage and movable in horizontal direction with said top carriage; drive means on said top carriage including means for moving said carriage, and means for raising and lowering said cage; a single upright guide mast located on one side of said cage and having guide means for guiding said cage during vertical movement; means connecting said guide mast to said top carriage for vertical movement relative to the same; and other drive means at the lower end of said guide mast adapted to engage the bottom of the elevator shaft for moving the lower end of said guide mast in direction of movement of said top carriage and at the speed at which the top end of said guide mast moves with said carriage.

2. An elevator system for a building having a plurality of floors with compartments arranged laterally of an elevator shaft, comprising, in combination, a top carriage adapted to be supported on the building for horizontal movement above the elevator shaft; an elevator cage suspended from said top carriage movable in vertical direction relative to said top carriage and movable in horizontal direction with said top carriage; drive means on said top carriage including means for moving said carriage, and means for raising and lowering said cage; a single upright guide mast located on one side of said cage and having guide means for guiding said cage during vertical movement; means connecting said guide mast to said top carriage for vertical movement relative to the same; rail means located at the bottom of the elevator shaft extending in the direction of movement of said top carriage; supporting rollers secured to the lower end of said guide mast and located on said rail means; and other drive means mounted at the lower end of said guide mast for driving said supporting rollers for moving the lower end of said guide mast in direction of movement of said top carriage and at the speed at which the top end of said guide mast moves with said carriage.

3. An elevator system for a building having a plurality of floors with compartments arranged laterally of an elevator shaft, comprising, in combination, a top carriage adapted to be supported on the building for horizontal movement above the elevator shaft; an elevator cage suspended from said top carriage movable in vertical direction relative to said top carriage and movable in horizontal direction with said top carriage; drive means on said top carriage including means for moving said carriage, and means for raising and lowering said cage; a single upright guide mast located on one side of said cage and having guide means for guiding said cage during vertical movement; means connecting said guide mast to said top carriage for pivotal movement about an axis transverse to the direction of movement of said top carriage and for vertical movement relative to the same; and other drive means at the lower end of said guide mast adapted to engage the bottom of the elevator shaft for moving the lower end of said guide mast in direction of movement of said top carriage and at the speed at which the top end of said guide mast moves with said carriage.

4. An elevator system for a building having a plurality of floors with compartments arranged laterally of an elevator shaft, comprising, in combination, a top carriage adapted to be supported on the building for horizontal movement above the elevator shaft; an elevator cage suspended from said top carriage movable in vertical direction relative to said top carriage and movable in horizontal direction with said top carriage; drive means on said top carriage for moving said carriage, and means for raising and lowering said cage: a single guide mast having an upper end portion formed with vertical slots; shaft means mounted on said top carriage extending transverse to the direction of movement of the same; slide blocks mounted on said shaft means and guided in said slots for vertical movement so that said mast is connected to said carriage for vertical and turning movement relative to the same, said guide mast being located on one side of said cage and having guide means for guiding said cage during vertical movement; and other drive means at the lower end of said main portion of said guide mast adapted to engage the bottom of the elevator shaft for moving the lower end of said guide mast in direction of movement of said top carriage and at the speed at which the top end of said guide mast moves with said carriage.

5. An elevator system for a building having a plurality of floors with compartments arranged laterally of an elevator shaft, comprising, in combination, a top carriage adapted to be supported on the building for horizontal movement above the elevator shaft; an elevator cage suspended from said top carriage movable in vertical direction relative to said top carriage and movable in horizontal direction with said top carriage; a drive means on said top carriage including means for moving said carriage, and means for raising and lowering said cage; a single upright guide mast located on one side of said cage and having guide means for guiding said cage during vertical movement; means connecting said guide mast to said top carriage for vertical movement relative to the same; other drive means at the lower end of said guide mast adapted to engage the bottom of the elevator shaft for moving the lower end of said guide mast in direction of movement of said top carriage and at the speed at which the top end of said guide mast moves with said carriage; vertically extending tension members having upper ends secured to said top carriage and lower ends supported on the lower end of said guide mast; and arresting means mounted on said cage and moving along said tension members and adapted to clamp said tension members.

6. An elevator system for a building having a plurality of floors with compartments arranged laterally of an elevator shaft, comprising, in combination, a top carriage adapted to be supported on the building for horizontal movement above the elevator shaft; an elevator cage suspended from said top carriage movable in vertical direction relative to said top carriage and movable in horizontal direction with said top carriage; drive means on said top carriage including means for moving said carriage, and means for raising and lowering said cage; a single upright guide mast located on one side of said cage and having guide means for guiding said cage during vertical movement; means connecting said guide mast to said top carriage for vertical movement relative to the same; other drive means at the lower end of said guide mast adapted to engage the bottom of the elevator shaft for moving the lower end of said guide mast in direction of movement of said top carriage and at the speed at which the top end of said guide mast moves with said carriage; two vertically extending tension cables arranged at diagonally opposite corners of said cage and having upper ends resiliently secured to said top carriage and lower ends; horizontal means connecting said lower ends of said cables to each other and to the lower end of said guide mast; and arresting means mounted on said cage and moving along said tension cables and adapted to clamp the same.

7. An arrangement as set forth in claim 1 wherein said guide means on said mast are a pair of guide rails; and wherein said cage includes a pair of guide shoes slidably guided on said guide rails.

8. An arrangement as set forth in claim 1 wherein said guide means on said mast are a pair of guide members; and wherein said cage includes two first pairs of guide rollers turnable about horizontal axes and two second pairs of guide rollers turnable about parallel horizontal axes perpendicular to said axes of said first pair of rollers, one first pair of rollers and one second pair of rollers engaging each of said guide members and rolling on the same during vertical movement of said cage.

9. An elevator system for building having a plurality of floors with compartments arranged laterally of an elevator shaft which is curved in a horizontal plane, comprising, in combination, an inner rail and an outer rail supported on the building on opposite sides of the elevator shaft and being parallel and curved in a horizontal plane, the inner rail being higher than the outer rail; a top carriage having wheels of smaller diameter rolling on said inner rail and wheels of greater diameter rolling on said outer rail, the axes of said wheels being located in the same horizontal plane, said carriage being movable along said rails above the elevator shaft; an elevator cage suspended from said top carriage movable in vertical direction relative to said top carriage and movable in horizontal direction with said top carriage; drive means on said top carriage including means operatively connected to said wheels for moving said carriage, and means for raising and lowering said cage; a single upright guide mast located on one side of said cage and having guide means for guiding said cage during vertical movement; means connecting said guide mast to said top carriage for vertical movement relative to the same; and other drive means at the lower end of said guide mast adapted to engage the bottom of the elevator shaft for moving the lower end of said guide mast in direction of movement of said top carriage and at the speed at which the top end of said guide mast moves with said carriage.

References Cited in the file of this patent

UNITED STATES PATENTS

| | | |
|---|---|---|
| 384,169 | Johnson | June 5, 1888 |
| 1,554,584 | Lake | Sept. 22, 1925 |
| 1,568,384 | Pungs | Jan. 5, 1926 |
| 2,511,619 | Bowser | June 13, 1950 |
| 2,652,938 | Murphy | Sept. 22, 1953 |
| 2,667,983 | Billings | Feb. 2, 1954 |
| 2,733,819 | Eliot | Feb. 7, 1956 |
| 2,875,910 | Kronfuss | Mar. 3, 1959 |